(12) United States Patent
Luo et al.

(10) Patent No.: US 6,920,794 B2
(45) Date of Patent: Jul. 26, 2005

(54) METHOD AND APPARATUS FOR ROTARY MACHINE VIBRATION CONTROL

(75) Inventors: Huageng Luo, Clifton Park, NY (US); Norman Arnold Turnquist, Sloansville, NY (US); Imdad Imam, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 199 days.

(21) Appl. No.: 10/065,346

(22) Filed: Oct. 7, 2002

(65) Prior Publication Data

US 2004/0068349 A1 Apr. 8, 2004

(51) Int. Cl.[7] .................................................. G01H 1/00
(52) U.S. Cl. ............................ 73/660; 73/662; 188/378
(58) Field of Search ........................... 73/660, 593, 662, 73/663, 659, 862.55; 188/378, 379; 492/16, 7.2, 7, 20; 706/23, 30, 14

(56) References Cited

U.S. PATENT DOCUMENTS

| | | | |
|---|---|---|---|
| 4,967,550 A | 11/1990 | Acton et al. ................ 60/39.29 |
| 4,972,389 A * | 11/1990 | Teel ............................ 367/155 |
| 5,197,010 A * | 3/1993 | Andersson .................... 73/457 |
| 5,374,129 A | 12/1994 | Vohr et al. ..................... 384/99 |
| 5,658,125 A | 8/1997 | Burns et al. .................... 415/1 |
| 5,769,545 A | 6/1998 | Bently et al. ................ 384/118 |
| 6,137,886 A | 10/2000 | Shoureshi .................. 381/71.2 |
| 6,142,672 A | 11/2000 | Bently et al. ................ 384/118 |
| 6,299,410 B1 | 10/2001 | Hilbert et al. .............. 416/145 |
| 6,309,333 B2 * | 10/2001 | Kirchner ....................... 492/16 |
| 6,361,483 B1 * | 3/2002 | Kirchner ....................... 492/16 |
| 6,378,672 B1 * | 4/2002 | Wakui ......................... 188/378 |
| 6,493,689 B2 * | 12/2002 | Kotoulas et al. .............. 706/23 |
| 6,601,054 B1 * | 7/2003 | Lo et al. ....................... 706/30 |

FOREIGN PATENT DOCUMENTS

EP 0 693 748 A2 1/1996
EP 0 926 387 A2 12/1998

* cited by examiner

Primary Examiner—Hezron Williams
Assistant Examiner—Jacques M. Saint-Surin
(74) Attorney, Agent, or Firm—Fletcher Yoder

(57) ABSTRACT

A vibration control system for a rotary machine having a rotor, includes a sensor disposed within the rotary machine for sensing vibration of the rotor, a vibration damping device disposed within the rotary machine for imparting a reaction force to the rotor, and a controller arranged in operable communication with the sensor and the vibration damping device. The controller is adapted to receive a sensor signal from the sensor and to send a control signal to the vibration damping device for damping the vibration of the rotor.

21 Claims, 8 Drawing Sheets

METHOD AND APPARATUS FOR ROTARY MACHINE VIBRATION CONTROL

TECHNICAL FIELD

This invention relates generally to a rotary machine, and more particularly to a method and apparatus for turbine rotor vibration control.

BACKGROUND

A rotary machine such as a turbomachine (e.g., gas turbine, steam turbine, or other turbine system for power generation) is subjected to a variety of forces under operating conditions, particularly when accelerating or decelerating through critical speeds that excite a natural frequency of the system. The magnitudes of the forces and the resulting strains and vibrations on the machine components depend on the machine operating conditions and structural characteristics. Excessive vibration within the machine can result in excessive noise, excessive wear to internal seals and bearing surfaces, increase in secondary leakage in the turbine, and loss of turbine performance and efficiency.

The rotors that are employed in turbines are typically long and flexible, are often supported on tilting pads or fixed arc journal bearings, and often operate at speeds in excess of one or more critical speeds. During certain operating conditions, but more particularly during acceleration and deceleration, the rotor may operate at a critical speed (e.g., at a natural frequency) and may experience excessive vibration due either to mass imbalance in the rotor or flex of the rotor.

SUMMARY

In one embodiment, a vibration control system for a rotary machine having a rotor includes a sensor disposed within the rotary machine for sensing vibration of the rotor, a vibration damping device disposed within the rotary machine for imparting a reaction force to the rotor, and a controller arranged in operable communication with the sensor and the vibration damping device. The controller is adapted to receive a sensor signal from the sensor and to send a control signal to the vibration damping device for damping the vibration of the rotor.

In another embodiment, a rotary machine having a vibration control system for controlling vibrations resulting from an excitation force acting upon the rotary machine includes a rotor bearing housing, at least one bearing supported within the rotor bearing housing, a rotor disposed adjacent the at least one bearing, at least one sensor disposed within the rotary machine to sense vibration of the rotor, at least one vibration damping device disposed between the rotor bearing housing and the at least one bearing to dampen the vibration of the rotor, and a controller arranged in operable communication with the at least one sensor and the at least one vibration damping device. The controller is adapted to receive a sensor signal from the at least one sensor and to send a control signal to the at least one vibration damping device for damping the vibration of the rotor.

In a further embodiment, a method for damping the vibration of a rotor in a rotary machine includes sensing the vibration of the rotor, communicating the sensed rotor vibration to a vibration damping device, and damping the vibration of the rotor.

In an additional embodiment, a vibration control system for a rotary machine having a rotor includes means for sensing vibration of the rotor, means for calculating a counter-vibration response signal based on the sensed vibration of the rotor, and means for generating a counter-vibration force based on the counter-vibration response signal for damping the vibration of the rotor.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–11.

Rotor Bearing Housing

Figure 1:
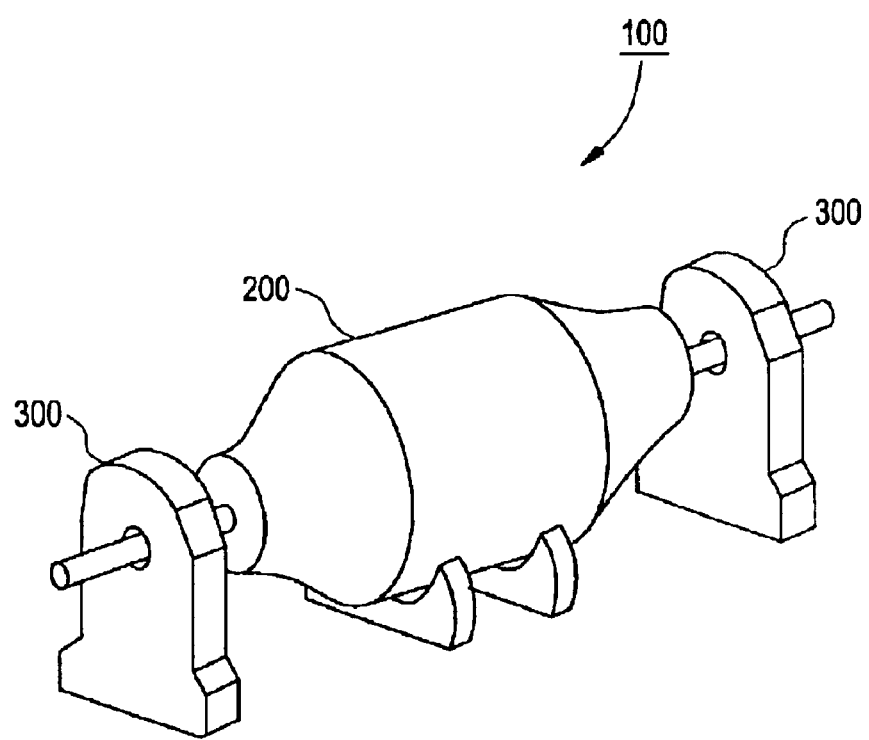
FIG. 1 depicts a generalized perspective view of a turbomachine operative for implementing the present invention.
Figure 2:
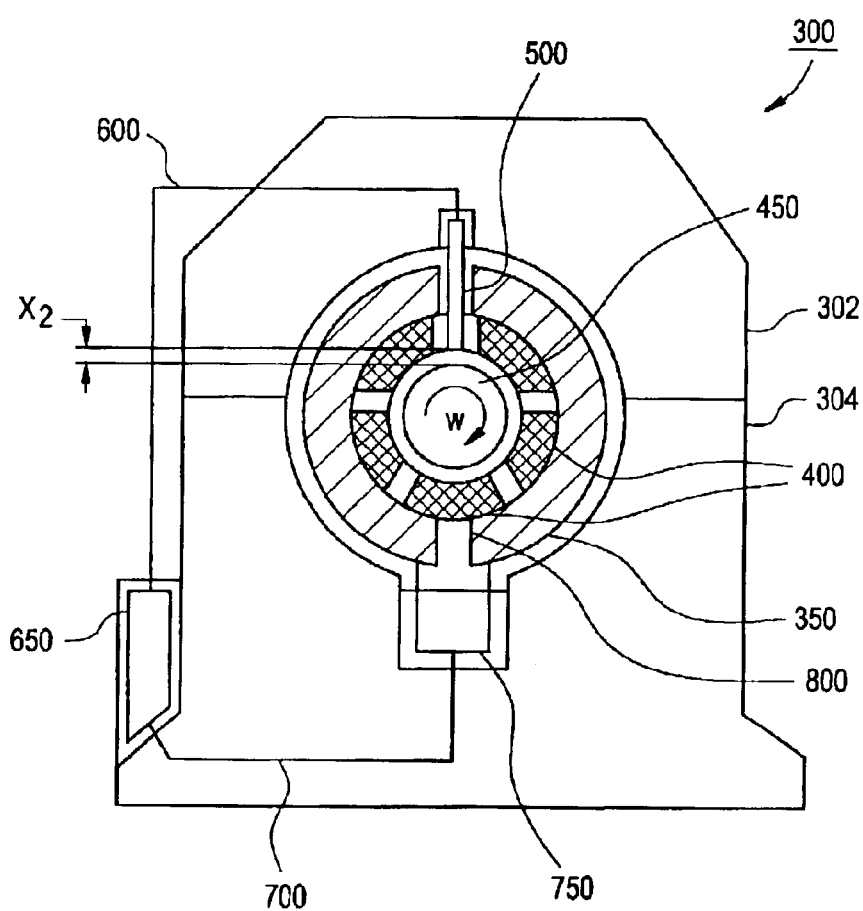
FIG. 2 depicts a generalized axial cross-sectional view of a rotor bearing housing of the turbomachine of FIG. 1 operative for implementing the present invention.

FIG. 1 depicts a generalized perspective view of a turbomachine 100 having a turbine system 200 and rotor bearing housings 300. Referring now to FIG. 2, an axial cross-sectional view of rotor bearing housing 300 is shown, which may be constructed of one or more housing sections, such as upper housing 302 and lower housing 304, to facilitate assembly. Radially arranged within rotor bearing housing 300 is a bearing pad support ring 350, bearing pads 400, and a rotor 450, wherein rotor 450 operates at a rotational frequency of ω (ω=2Πf, f=rotational frequency in Hertz). Bearing pad support ring 350 and bearing pads 400 may be constructed as individual components as shown, or as an integral unit. FIG. 2 depicts five bearing pads 400 supported by bearing pad support ring 350, however, it is understood that the instant invention is not restricted to a particular number of pads, and may be employed where the bearings are either bearing pads, as discussed, or fixed arc journal bearings, roller bearings, or ball bearings, as will be discussed below.

In signal communication with rotor 450 is a vibration sensor 500, which may be a proximity sensor (displacement type sensor), velocimeter (velocity type sensor), accelerometer (acceleration type sensor), or any other sensing device that is capable of sensing vibration, which picks up the level of vibration from rotor 450. Sensor 500 is supported by bearing housing 300 and is arranged in signal communication with controller 650 via signal line 600. Controller 650 receives the sensor signal, computes a response signal, as will be discussed below, and sends the response signal via signal line 700 to piezoelectric actuator 750. While signal lines 600, 700 are depicted as single lines, it is understood that these single lines also represent twisted wire pair, ethernet, wireless communication, or any other communication means suitable for transmitting the sensor signal. It is also understood that the devices connected at either end of signal lines 600, 700 are capable of sending and receiving associated signals.

Figure 3:
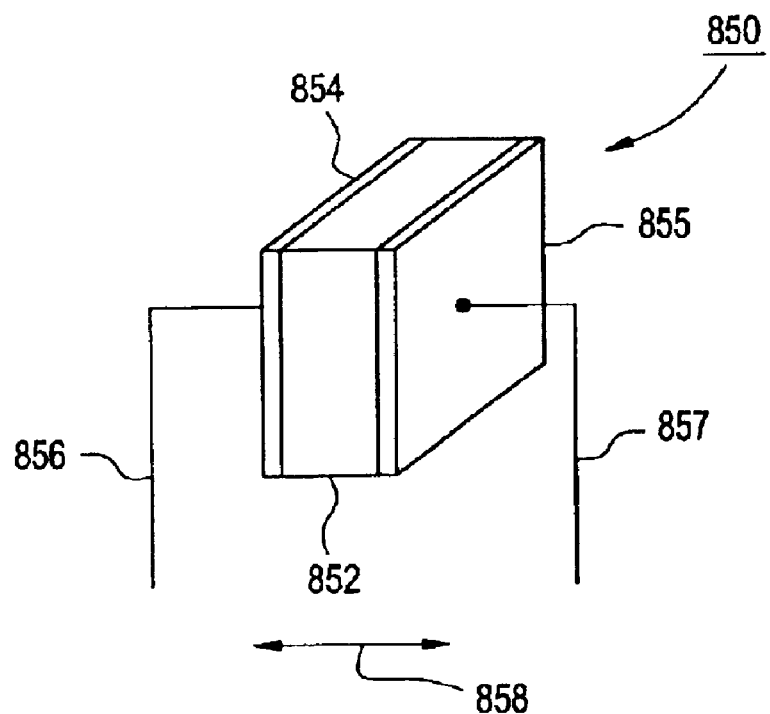
FIG. 3 depicts a generalized perspective view of one type of piezoelectric component and electrical conductors that may be implemented in the present invention.
Figure 4:
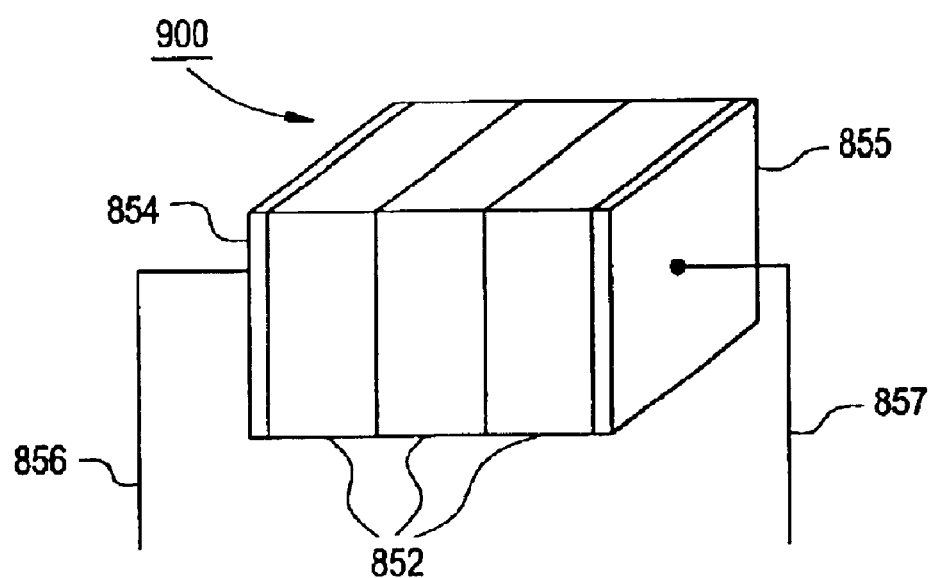
FIG. 4 depicts a generalized perspective view of a stack of piezoelectric components of the type in FIG. 3.

The construction of piezoelectric actuator 750 is depicted in FIGS. 3 and 4, and will be discussed below. Piezoelectric actuator 750 is arranged in operable communication with bearing pad 400 via bearing pad support pin 800. Support pin 800 is arranged to provide a force to bearing pad 400, and therefore to rotor 450, that is directed perpendicular, or trans-axial, to the rotor axis. Support pin 800 is shown to be supporting a single bearing pad 400, however, other individual pads may be supported on separate support pins 800 and piezoelectric actuators 750, or the entire bearing may be supported on a single support pin 800 and piezoelectric actuator 750. The latter arrangement could also be used for fixed arc journal bearings, roller bearings, or ball bearings.

Piezoelectric Actuator

FIGS. 3 and 4 depict a generalized perspective view of one type of piezoelectric component and electrical conductors, and a generalized perspective view of a stack of piezoelectric components and electrical conductors, respectively. Referring to FIG. 3, a piezoelectric component 850 includes a block of piezoelectric material 852, electrically conductive electrodes 854, 855, arranged at opposite surfaces thereof, and electrical leads 856, 857, connected to the electrodes 854, 855. Piezoelectric material 852, and piezoelectric actuator 750, may be made from ceramic material lead-zirconate-titanate (PZT), lead-titanate (PbTiO2), lead-zirconate (PbZrO3), barium-titanate (BaTiO3), or any other material exhibiting a piezoelectric or polarized electrostrictive effect. The noted ceramics do not, in the pure sense, exhibit a piezolectric effect, but rather a polarized electrostrictive effect. To be truly piezoelectric, a material must be formed as a single crystal, and since a ceramic is a multi-crystalline structure, it must first be polarized to align the individual grains to produce the piezoelectric effect. Since the term piezoelectric has become interchangeable with polarized electrostrictive effect in most literature, the term piezoelectric effect will be used herein for simplicity. Once the piezoelectric material has been polled (polling is the process of applying a one time voltage differential between electrically opposite sides of the piezoelectric material to orient the piezoelectric at the crystalline level, thereby establishing an electrical axis 858), an applied voltage along the electrical axis 858 will result in a corresponding strain along the same axis, thereby providing an electrical-to-mechanical energy conversion (i.e., force) in the direction of electrical axis 858. The piezoelectric device 900 depicted in FIG. 4 includes a plurality of blocks of piezoelectric material 852 arranged adjacent one another with electrodes 854, 855, arranged at opposite surfaces thereof, and with electrical leads 856, 857, connected to the electrodes 854, 855. The arrangement of FIG. 4 is typically referred to as a piezoelectric stack, and is generally employed to magnify the piezoelectric effect for a given applied voltage. The piezoelectric device (piezoelectric stack) 900 is one type of piezoelectric device that may be employed in piezoelectric actuator 750, however, any device exhibiting a piezoelectric effect is equally applicable.

Closed-Loop Feedback Control System

Referring to FIG. 2, vibration amplitudes associated with rotor 450 are sensed by vibration sensor 500, which communicates the vibration signal along signal line 600 to controller 650, which calculates a response signal and transmits the response signal via signal line 700 to piezoelectric actuator 750, which receives an input voltage from the response signal and produces a corresponding output deflection to move bearing pad support pin 800 and bearing pad 400 in a motion counter to the vibratory motion of rotor 450, thereby damping the rotor vibration and reducing the magnitude of the vibration signal sent by vibration sensor 500. In the analytical model presented and discussed below, a single vibration mode system is used as an example, however, the controller 650 can deal with multiple vibration modes in practice. The counter vibrations of piezoelectric actuator 750 are preferably at the same frequencies of vibration of rotor 450, however, the amplitudes and phases of the counter vibrations are determined by controller 650 and an imbedded digital signal processor, discussed below in reference to FIG. 5, such that the total vibrations at the sensor 500 are minimized.

Figure 5:
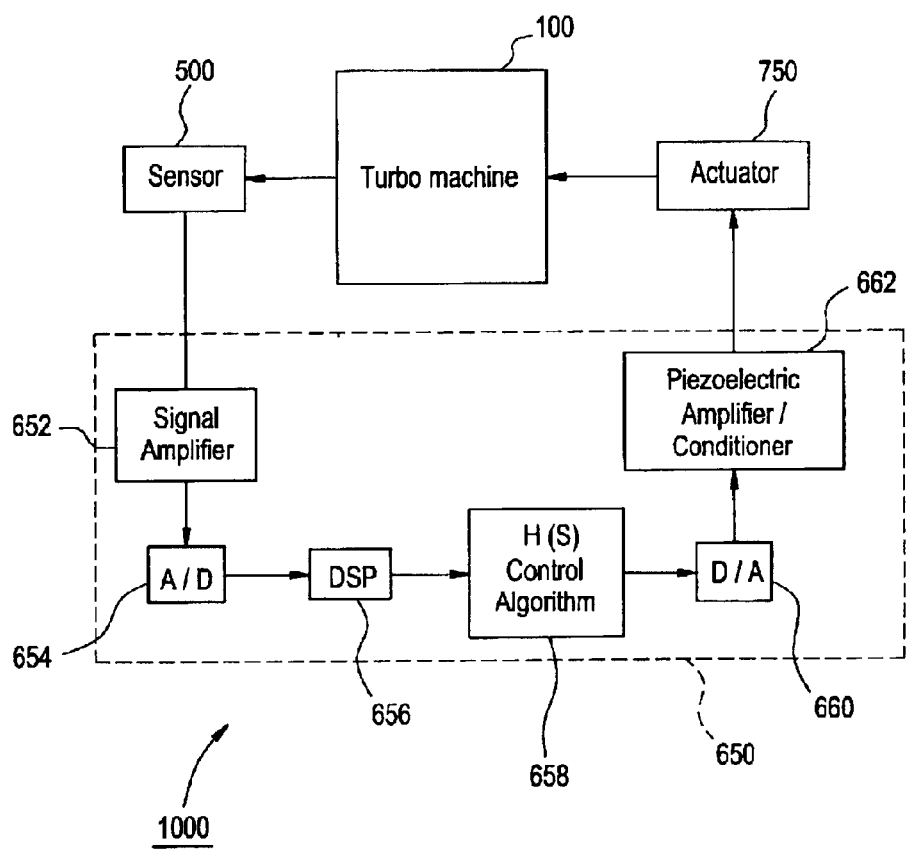
FIG. 5 depicts a generalized schematic of a control system for implementing the present invention.

Referring now to FIG. 5, control system 1000 is shown to include turbomachine 100, vibration sensor 500, controller 650, piezoelectric actuator 750, and the communicative relationships therebetween. Controller 650 is shown having a signal amplifier 652, an analog to digital (A/D) converter 654, a digital signal processor (DSP) 656, a control algorithm 658, a digital to analog converter (D/A) 660, and a piezoelectric amplifier/conditioner 662. Signal amplifier 652 conditions the sensor signal by converting it into a stable voltage signal for stable transmission and noise rejection. The conditioned signal is then digitized by A/D converter 654 for digital signal processing at DSP 656. Control algorithm 658 analyzes the conditioned signal provided by DSP 656 (system input) and calculates an output response signal that is fed to D/A converter 660 (system output). The system output to input ratio of the control algorithm 658 is typically referred to as a transfer function (H(s)) and is determined by analysis of the system parameters, which is best seen by referring to FIG. 6, as will be discussed below. The control algorithm output signal is then converted to an analog signal by D/A converter 660, and then further conditioned by piezoelectric amplifier/conditioner 662 before being fed to piezoelectric actuator 750.

Analytical Model

Figure 6:
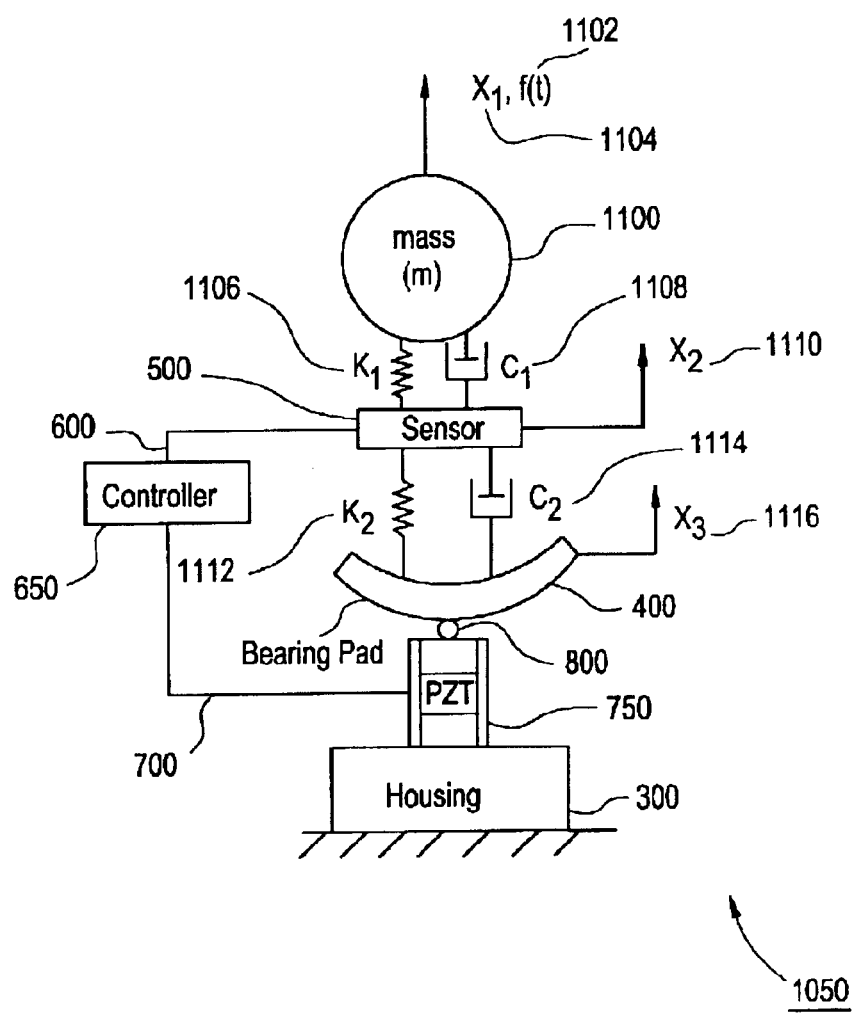
FIG. 6 depicts a generalized analytical model of the rotor bearing housing of FIG. 2.

FIG. 6 depicts a generalized analytical model 1050 of the rotor bearing housing of FIG. 2, wherein mass (m) 1100 represents the centralized mass of rotor 450, excitation force (f(t)) 1102 represents the system driving force associated with the oscillatory motion of rotor 450, displacement variable (x1) 1104 represents the centralized displacement of rotor 450, spring constant (k1) 1106, and damping constant (c1) 1108, represent the spring and damping constants of rotor 450, respectively, displacement variable (x2) 1110 represents the rotor displacement sensed by vibration sensor 500, spring constant (k2) 1112, and damping constant (c2) 1114, represent the equivalent spring and damping constants of the oil film between bearing pad 400 and rotor 450, respectively, and displacement variable (x3) 1116 represents the displacement of bearing pad 400. The mass of sensor 500 is considered negligible in comparison to the mass of rotor 450 and is therefore omitted. However, it will be appreciated that the omitted mass could be included if conditions warranted it. Thus, the system equations for the dynamic system of FIG. 6, represented in the time-domain where (t) is time, are:

$$mx_1'' + c_1(x_1' - x_2') + k_1(x_1 - x_2) = f(t);\qquad\text{Equa.-1}$$

$$c_1(x_1' - x_2') + k_1(x_1 - x_2) = k_2(x_2 - x_3) + c_2(x_2' - x_3'); \text{ and}\qquad\text{Equa.-2}$$

$$x_3 = -\alpha x_2 - \beta x_2',\qquad\text{Equa.-3}$$

where $\alpha$ is a displacement gain constant of piezoelectric actuator 750, and $\beta$ is a velocity gain constant of piezoelectric actuator 750. Gain constants $\alpha$ and $\beta$ are analytically determined using system control theory and proportional-derivative feedback control law. Solutions to $\alpha$ and $\beta$ take into consideration system stability and control convergence with no oscillations, thereby providing active feedback and control. Preferably, $\alpha > 1$ and $\beta > 0$. The single prime (') and double prime ('') notations represent first derivative and second derivative operators, as a function of time, respectively.

Transforming the above system equations from the time domain to the frequency domain for ease of signal processing, using known transformation procedures, and solving for the system transfer function H(s) 658, yields;

$$H(s) = X_1(s)/F(s)\qquad\text{Equa.-4}$$

$$= \frac{k_1 + c_1 s + (1 + \alpha + \beta s)(k_2 + c_2 s)}{ms^2[k_1 + c_1 s + (1 + \alpha + \beta s)(k_2 + c_2 s)] + (1 + \alpha + \beta s)(k_1 + c_1 s)(k_2 + c_2 s)}\qquad\text{Equa.-5}$$

where, $$s = j\omega,\qquad\text{Equa.-6}$$

$$\omega = 2\pi f,\qquad\text{Equa.-7}$$

$$j = \text{square root } (-1), \text{ and}\qquad\text{Equa.-8}$$

$$f = \text{rotational frequency of rotor } \mathbf{450} \text{ (in Hertz)}.\qquad\text{Equa.-9}$$

Initial values for system variables (m) 1100, (k1) 1106, (c1) 1108, (k2) 1112, (c2) 1114, are established using numerical methods, such as finite element analysis (FEA), and then modified by comparison to empirical data so that the numerical model reflects the fundamentals of the real system. Initial values for gain constants $\alpha$ and $\beta$ are established using the aforementioned proportional-derivative feedback law, and then modified as discussed above.

Armed with modified, or second generation, values for variables (m) 1100, (k1) 1106, (c1) 1108, (k2) 1112, (c2) 1114, $\alpha$, $\beta$, $\omega$ and f, the system transfer function H(s) can be calculated, and an output response X1(s) can be determined for a given input F(s). F(s) is provided by the operating conditions of the turbomachine 100 and rotor 450. If the calculated system output response X1(s) differs from the sensed vibration (x2) 1110 as sensed by vibration sensor 500, then controller 650, via control algorithm H(s) 658, adjusts the excitation (x3) 1116 of piezoelectric actuator 750, thereby providing a closed-loop feedback control system for damping undesirable vibrations experienced by rotor 450.

Empirical and Analytical Modeling

Figure 7:
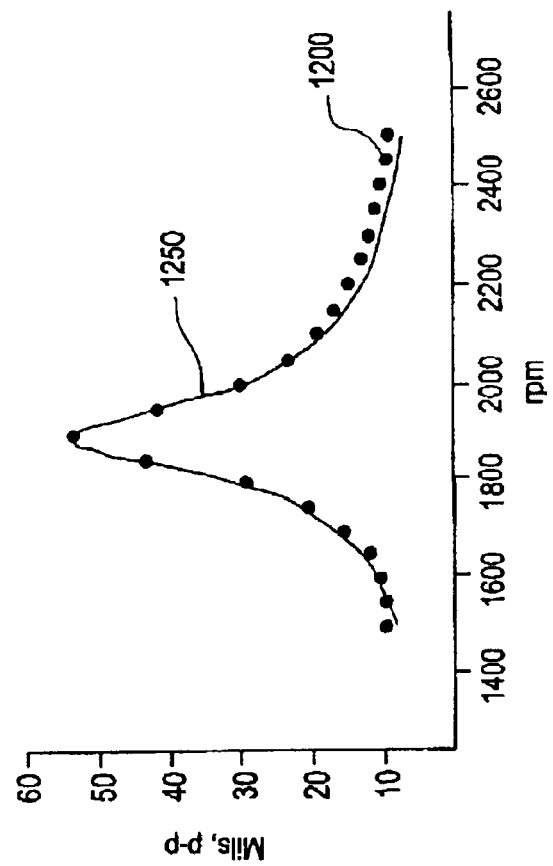
FIG. 7 depicts empirical data and analytical curve fitting representative of sensed vibration from a turbomachine of FIG. 1.

FIG. 7 depicts empirical data 1200 and associated curve fitting 1250, which is representative of sensed vibration from a turbomachine 100 of FIG. 1. Using the following empirical parameters from curve fitting 1250;

$$c1 = 11.97 \text{ lb*sec/in}\qquad\text{Equa.-10}$$

$$k1 = 6078470 \text{ lb/in}\qquad\text{Equa.-11}$$

System Damping Ratio $\zeta = 3.62\%$, Equa.-12 in combination with the following numerical parameters from numerical simulation (i.e., analytical model 1050 and control algorithm H(s) 658);

$$c2 = 17100 \text{ lb*sec/in}\qquad\text{Equa.-13}$$

$$k2 = 13.9e6 \text{ lb/in}\qquad\text{Equa.-14}$$

$$m = 108.7 \text{ lb*s}^2/\text{in},\qquad\text{Equa.-15}$$

yields a numerical resonance of 1895 rpm. The empirical resonance under the same conditions, as derived through curve fitting 1250, is 1895.18 rpm, which is a difference of less than 0.01%, thereby confirming that the analytical model is a reasonable representation of the real system.

As shown in FIG. 7, the peak-to-peak resonant amplitude at the 1895/1895.18 rpm resonance is 53 mils, which represents the amplitude of vibration of rotor 450 with no piezoelectric damping.

Figure 8:
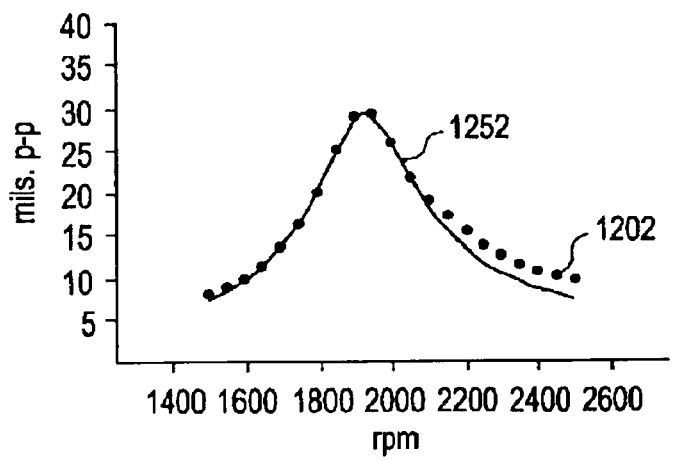
FIGS. 8–10 depict numerical predictions of the analytical models of FIGS. 6 and 7 at 2×, 4× and 6× damping.
Figure 9:
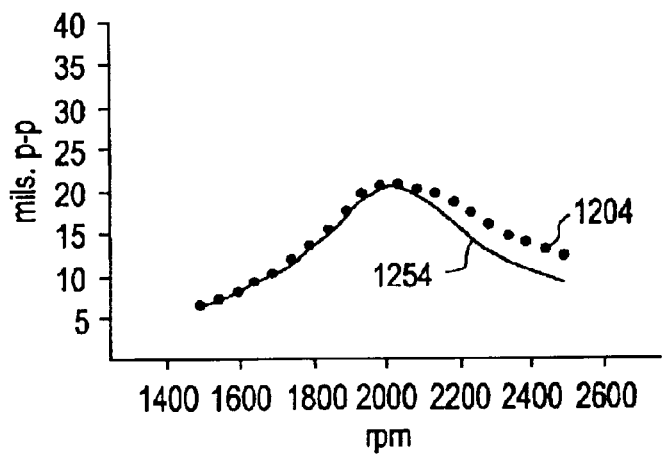
Figure 10:
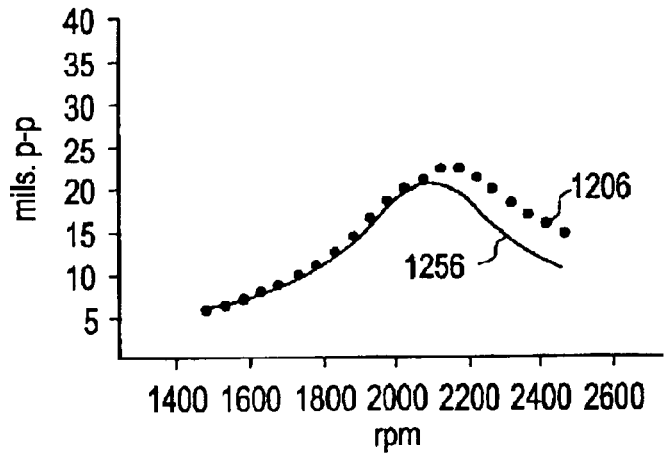

Applying the above empirical and numerical system parameters at varying degrees of damping, yields peak-to-peak resonant amplitudes, as shown in FIGS. 8–10, of; 29 mils at 2x damping (FIG. 8), 20 mils at 4x damping (FIG. 9), and 20 mils at 6x damping (FIG. 10).

The degree of damping, system damping, is modified by modifying the value of damping constant (c2) in Equa.-5, so that (c2) is 2-times (2x), 4-times (4x), or 6-times (6x), its second generation value. The values of $\zeta$ and c2 are related by;

$$\zeta = c_2/2\omega m\qquad\text{Equa.-16}$$

$$= \frac{c_2}{2(2\pi RPM/60)m}\qquad\text{Equa.-17}$$

FIGS. 8–10 depict the empirical 1202, 1204, 1206, and analytical 1252, 1254, 1256, system responses under the 2x, 4x, and 6x damping conditions discussed above, respectively.

By using the analytical model to modify damping constant c2, which represents the damping effect of piezoelectric actuator 750, an active vibration control system using a piezoelectric actuator 750 can be analyzed. As seen in FIGS. 8–10 and as discussed above, the use of an active vibration control system as herein described can provide a reduction in rotor vibration at critical frequencies of at least 2:1 (that is, at least a 50% reduction in rotor vibration).

Method

Figure 11:
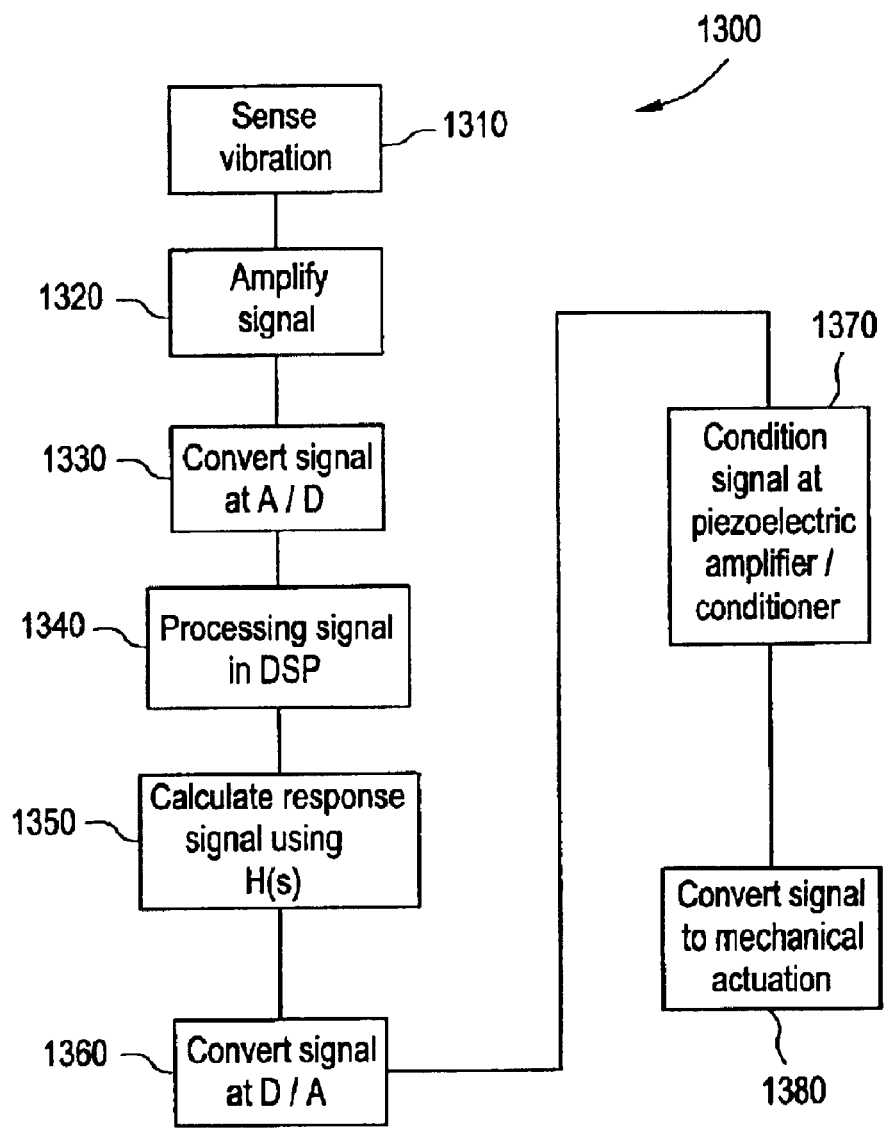
FIG. 11 depicts a method that implements the present invention.

Referring to the flowchart of FIG. 11, a process 1300 for actively damping the vibration in turbomachine 100 is shown. Process 1300 includes; sensing 1310 the vibration of rotor 450, amplifying 1320 the sensed signal to signal amplifier 652, converting 1330 the analog signal to a digital signal at A/D converter 654, processing 1340 the signal in DSP 656, calculating 1350 a response signal using transfer function H(s) 658, converting 1360 the response signal to analog signal at D/A converter 660, conditioning 1370 the response signal at piezoelectric amplifier/conditioner 662, and converting 1380 the conditioned electrical signal to a mechanical actuation at piezoelectric actuator 750. The flowchart of FIG. 11 is presented to outline one sample method of software or logic flow and is not meant to indicate the only method that may be employed.

The disclosed embodiment has the advantage of reducing rotor vibration at critical frequencies by at least 50% compared to systems in which the bearing pads are rigidly supported. The disclosed embodiment can also operate under non-damped conditions if the closed-loop feedback control system was to power off, thereby resulting in a fail-safe condition. Additionally, the disclosed embodiment can be turned off during steady-state operation, since under steady-state conditions the rotor typically runs at a speed far-removed from any system critical speed. Furthermore, the disclosed embodiment is compact and retrofittable to existing turbomachines, since turbines typically include vibration monitoring equipment and sensors, but without the disclosed invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vibration control system for a rotary machine having a rotor, comprising:

a sensor disposed within the rotary machine for sensing vibration of the rotor;

a vibration damping device disposed within the rotary machine for imparting a reaction force to the rotor; and a controller arranged in operable communication with said sensor and said vibration damping device, said controller adapted to receive a sensor signal from said sensor and to send a control signal to said vibration damping device for damping the vibration of the rotor, wherein the control signal to said vibration damping device is adapted to adjust an excitation of said vibration damping device based upon the following relationship $$H(s)=X1(s)/F(s);$$

wherein $H(s)$ is a system transfer function, $X1(s)$ is a calculated system output response and $F(s)$ is a vibration frequency input based upon said sensor signal.

2. The vibration control system of claim 1, wherein:
   said vibration damping device comprises a piezoelectric effect.

3. The vibration control system of claim 1, wherein:
   said vibration damping device comprises a piezoelectric actuator.

4. The vibration control system of claim 3, wherein:
   said piezoelectric actuator comprises a piezoelectric stack.

5. The vibration control system of claim 3, wherein:
   said piezoelectric actuator is made of a material selected from the group consisting of; lead-zirconate-titanate, lead-titanate, lead-zirconate, and barium-titanate.

6. The vibration control system of claim 3, wherein:
   said controller comprises:

a signal amplifier for receiving the vibration sensor signal and conditioning the signal;

an analog-to-digital converter for digitizing the conditioned signal;

a digital signal processor for further conditioning the digitized signal;

a control algorithm for calculating an output signal based on the input signal from said digital signal processor;

a digital-to-analog converter for converting the output signal into an analog response signal; and a piezoelectric amplifier for conditioning the analog response signal.

7. The vibration control system of claim 1, wherein:
   said vibration damping device disposed within the rotary machine further imparts a trans-axial reaction force to the rotor that is counter to the vibration of the rotor.

8. The vibration control system of claim 1, wherein:
   said vibration damping device dampens the vibration of the rotor by at least 50-percent.

9. The vibration control system of claim 1, further comprising:
   an active vibration control system wherein said vibration damping device comprises an actuator having at least one gain constant.

10. A rotary machine having a vibration control system for controlling vibrations resulting from an excitation force acting upon the rotary machine, comprising:

a rotor bearing housing;

at least one bearing supported within said rotor bearing housing;

a rotor rotatably disposed adjacent said at least one bearing;

at least one sensor disposed within the rotary machine to sense vibration of said rotor;

at least one vibration damping device disposed proximate said at least one bearing to dampen the vibration of said rotor; and a controller arranged in operable communication with said at least one sensor and said at least one vibration damping device, said controller adapted to receive a sensor signal from said at least one sensor and to send a control signal to said at least one vibration damping device, wherein the control signal to said at least one vibration damping device is adapted to adjust an excitation of said at least one vibration damping device based upon the following relationship $$H(s)=X1(s)/F(s);$$

wherein $H(s)$ is a system transfer function, $X1(s)$ is a calculated system output response and $F(s)$ is a vibration frequency input based upon said sensor signal.

11. The rotary machine of claim 10, wherein:
    said at least one vibration damping device comprises a piezoelectric effect.

12. The rotary machine of claim 10, wherein:
    said at least one vibration damping device comprises a piezoelectric actuator.

13. The rotary machine of claim 12, wherein:
    said piezoelectric actuator comprises a piezoelectric stack.

14. The rotary machine of claim 12, wherein:
    said piezoelectric actuator is made of a material selected from the group consisting of; lead-zirconate-titanate, lead-titanate, lead-zirconate, and barium-titanate.

15. The rotary machine of claim 10, wherein:
    said at least one bearing comprises at least one bearing pad and further comprising at least one bearing support pin disposed between said at least one vibration damping device and said at least one bearing pad.

16. The rotary machine of claim 10, wherein:
said at least one bearing is selected from the group consisting of; bearing pad, tilting pad, journal bearing, roller bearing and ball bearing.

17. A method for damping the vibration of a rotor in a rotary machine, comprising:
sensing the vibration of the rotor;
communicating the sensed rotor vibration to a vibration damping device; and
damping the vibration of the rotor based upon the following relationship $$H(s)=X1(s)/F(s);$$

wherein H(s) is a system transfer function, X1(s) is a calculated system output response and F(s) is a Vibration frequency input based upon a sensed vibration signal.

18. The method of damping set forth in claim 17, wherein said communicating the sensed rotor vibration to a vibration damping device, further comprises:
communicating the sensed rotor vibration to a piezoelectric actuator.

19. The method of damping set forth in claim 18, wherein said communicating the sensed rotor vibration to a piezoelectric actuator, further comprises:
amplifying the vibration sensor signal;
converting the amplified signal from an analog signal to a digital signal;
processing the digital signal in preparation for analysis;
calculating a counter-vibration response signal from the processed signal;
converting the response signal from a digital signal to an analog signal; and
conditioning the analog signal for use by the piezoelectric actuator.

20. The method of damping set forth in claim 19, wherein said damping the vibration of the rotor, further comprises:
applying the counter-vibration response signal to the piezoelectric actuator;
vibrating the piezoelectric actuator at a frequency similar to the rotor vibration frequency.

21. A vibration control system for a rotary machine having a rotor, comprising:
means for sensing vibration of the rotor;
means for calculating a counter-vibration response signal based upon the following relationship $$H(s)=X1(s)/F(s);$$

wherein H(s) is a system transfer function, X1(s) is a calculated system output response and F(s) is a vibration frequency input based upon a sensed vibration signal; and
means for generating a counter-vibration force based on the counter-vibration response signal for damping the vibration of the rotor.

* * * * *